United States Patent
Yip

[11] Patent Number: 5,746,115
[45] Date of Patent: May 5, 1998

[54] ELECTRIC TOASTER—BUNWARMER

[75] Inventor: Kit Chuen Yip, Kwun Tong, Hong Kong

[73] Assignee: G.E.W. Corporation Limited, Kowloon, Hong Kong

[21] Appl. No.: 516,648

[22] Filed: Aug. 18, 1995

[30] Foreign Application Priority Data

Aug. 27, 1994 [GB] United Kingdom ............... 9419567

[51] Int. Cl.$^6$ .................................................. A47J 37/08
[52] U.S. Cl. .......................... 99/339; 99/340; 99/357; 99/389; 99/391
[58] Field of Search ............................ 99/327, 339, 340, 99/357, 385–396; 219/489, 492, 510, 518, 519, 385, 386, 521, 531, 405

[56] References Cited

U.S. PATENT DOCUMENTS

| | | | |
|---|---|---|---|
| 2,028,159 | 1/1936 | Kemp | 99/391 X |
| 3,760,713 | 9/1973 | Sato | 99/339 X |
| 3,866,525 | 2/1975 | Oxel | |
| 4,276,821 | 7/1981 | Brown | 99/339 |
| 5,072,662 | 12/1991 | Yip | 99/327 |
| 5,317,960 | 6/1994 | Cumfer | 99/385 X |

FOREIGN PATENT DOCUMENTS

| | | |
|---|---|---|
| 0084065 | 1/1982 | European Pat. Off. . |
| 0314826 | 11/1987 | European Pat. Off. . |
| 1245067 | 9/1971 | United Kingdom . |

*Primary Examiner*—Timothy F. Simone
*Attorney, Agent, or Firm*—Birch, Stewart, Kolasch & Birch, LLP

[57] ABSTRACT

An electric toaster (10) which comprises a body (11) having at least one bread compartment (12), an electrical heating element provided inside the compartment (12), a hinged support (17) provided on the body (11) and above the compartment (12) for supporting a piece of food for warming by the heating element. The support (17) is movable between an extended condition for operation and a collapsed condition for storage. It is formed by two inverted broad generally U-shaped elongate support bars (18,19) each having a central limb (18A/19A) for supporting a piece of food and a pair of opposite side limbs (18B,18C/19B,19C). The support bars (18,19) are arranged to have their side limbs (18B,19B/18C,19C) at each end of the central limbs (18A, 19A) adjacent each other. A manual operating member (26) for moving the support (17) between the extended and collapsed conditions. One (18B) of the side limbs is in engagement with the operating member (26) for movement thereby. One side limb (18B) has, at a position above the body (11), a lateral part (20A/20B) in engagement with the adjacent side limb (19B) such that the two support bars (18,19) are simultaneously movable by the operating member (26).

20 Claims, 6 Drawing Sheets

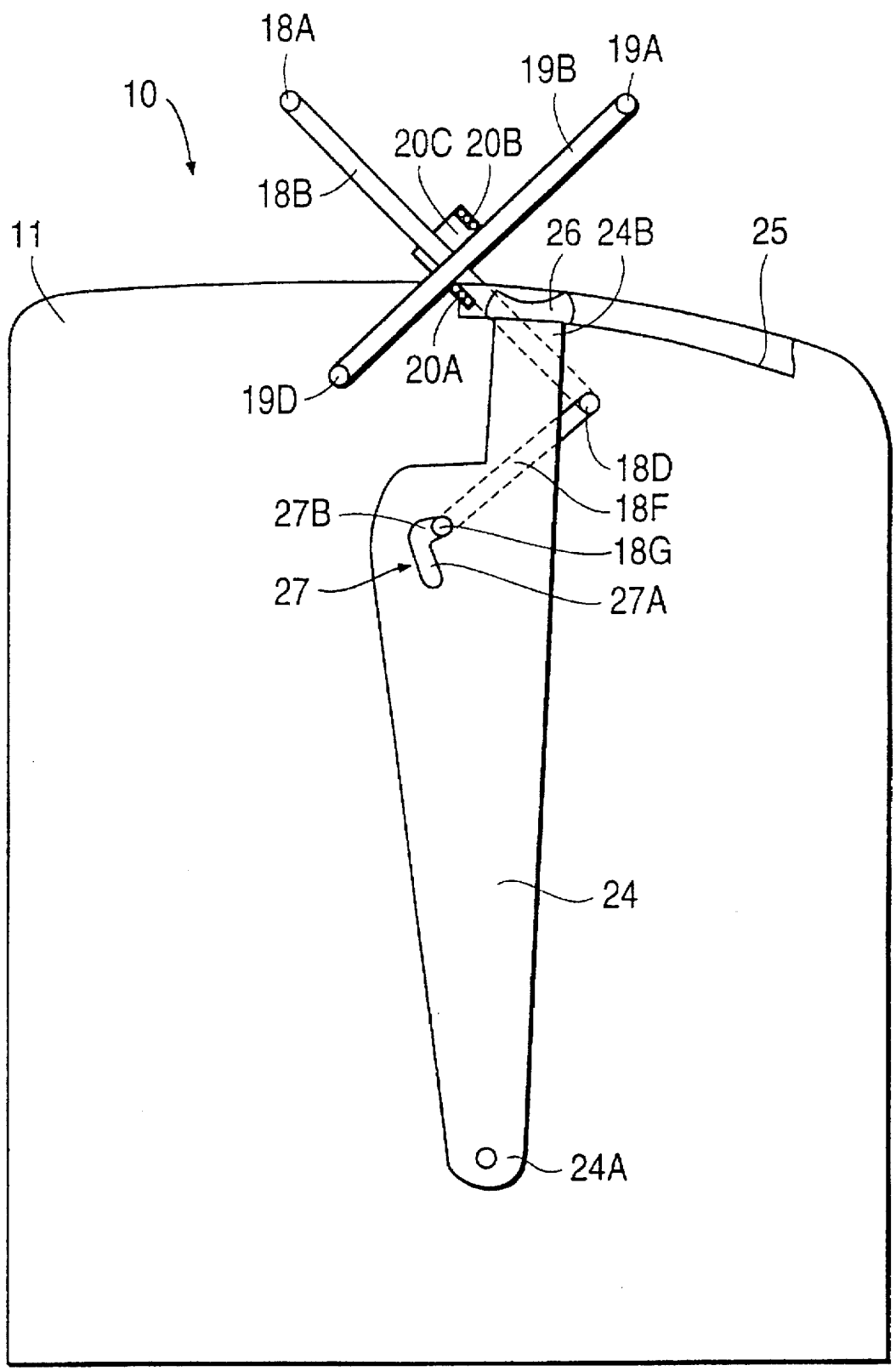

ELECTRIC TOASTER—BUNWARMER

The present invention relates to an electric toaster having an extendable/collapsible support for supporting a piece of food, such as a bun, a roll or the like to be reheated or warmed by the toaster.

BACKGROUND OF THE INVENTION

According to the invention, there is provided an electric toaster which comprises a body having at least one compartment for accommodating a slice of bread, an electrical heating element mounted on opposite sides of the compartment for heating a piece of bread in the compartment, a hinged support provided on the body and above the compartment for supporting a piece of food for warming by the heating element, the support being movable between an extended condition for operation and a collapsed condition for storage and being formed by two inverted broad generally U-shaped elongate support members each having a central limb for supporting the piece of food and a pair of opposite side limbs, which support members are arranged to have their side limbs at each end of the central limbs adjacent each other, and a manual operating member for moving the support between the extended and collapsed conditions, wherein one of the side limbs is in engagement with the operating member for movement thereby, and one side limb has, at a position above the body, a lateral part in engagement with the side limb adjacent to the one side limb such that the two support members are simultaneously movable by the operating member.

Preferably, the lateral part is in substantially continuous engagement with the side limb adjacent to the one side limb.

It is preferred that the side limb in engagement with the operating member is the side limb having the lateral part.

In a specific arrangement, the adjacent side limbs at each end of the central limbs cross each other substantially in the form of a letter "X" when the support is in the extended condition, and the lateral part is provided on the one side limb at a position adjacent to the crossing point between that side limb and the adjacent side limb.

Preferably, one side limb has another lateral part for engagement with the side limb adjacent to the one side limb in order to maintain the support in the extended condition.

More preferably, the two lateral parts are provided on the same side limb, which together form a gap engaging with the adjacent side limb.

Even more preferably, the two lateral parts are provided by a one-piece member secured to the side limb.

In a preferred embodiment, a sliding hinge is provided by the lateral part or parts between the pair of inter-engaged side limbs.

In a specific construction, the operating member is provided by a pivotal member hinged at one end with respect to the body and provided at another end with a sliding knob for manual operation.

BRIEF DESCRIPTION OF THE INVENTION

The invention will now be more particularly described, by way of example only, with reference to the accompanying drawings, in which:

FIG. 7 is an end view corresponding to FIG. 6, showing the support in a fully-extended condition.

DETAILED DESCRIPTION OF THE PREFERRED EMBODIMENTS

Figure 1:
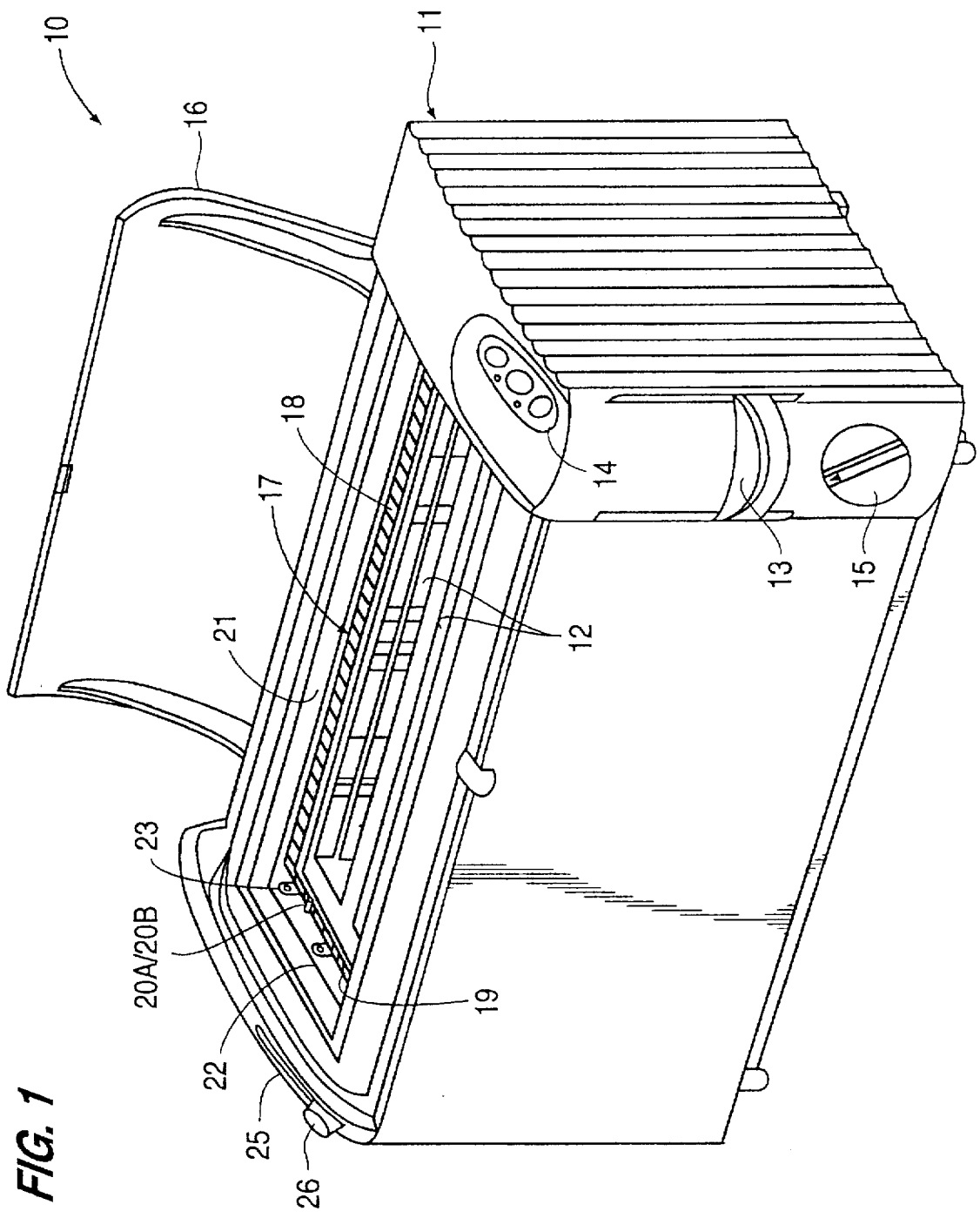
FIG. 1 is a front perspective view of an embodiment of an electric toaster in accordance with the invention, said toaster incorporating a top support which is shown in a collapsed condition.

Referring firstly to FIGS. 1 to 4, there is shown an electric toaster 10 embodying the invention, which toaster 10 comprises a body 11 having a pair of side-by-side vertical flat compartments 12 for accommodating slices of bread for toasting. The compartments 12 have elongate open tops. Electrical heating wires (not shown) are mounted on opposite sides of each compartment 12 for heating a slice of bread placed therein. Each compartment 12 is provided with an internal carriage (not shown) for supporting a slice of bread, which is movable upwards to expose the slice of bread and downwards to place the slice of bread wholly inside the compartment 12 for heating by the heating wires. Inside the right end, the body 11 contains an internal movement mechanism (not shown), including an exposed vertically slidable knob 13, for simultaneously moving the two bread carriages up and down and an internal electronic control circuit (not shown), including a row of three exposed press buttons 14 and a timer control knob 15, for controlling the operation of the heating wires and the release of the bread carriages. The body 11 further includes a hinged top lid 16 for covering the bread compartments 12 when the toaster 10 is not in use.

The electric toaster 10 has a warming function in addition to the aforesaid, conventional toasting function. This warming function may be performed when the internal heating wires are turned on, irrespective of whether there is any slice of bread placed inside the compartments 12. For the provision of this warming function, the toaster 10 includes a collapsible support 17 installed on or directly above the compartments 12 for supporting a piece of food, such as a bun, a roll or the like, to be warmed (or reheated) by rising hot air generated by the heating wires inside the compartments 12.

Figure 3:
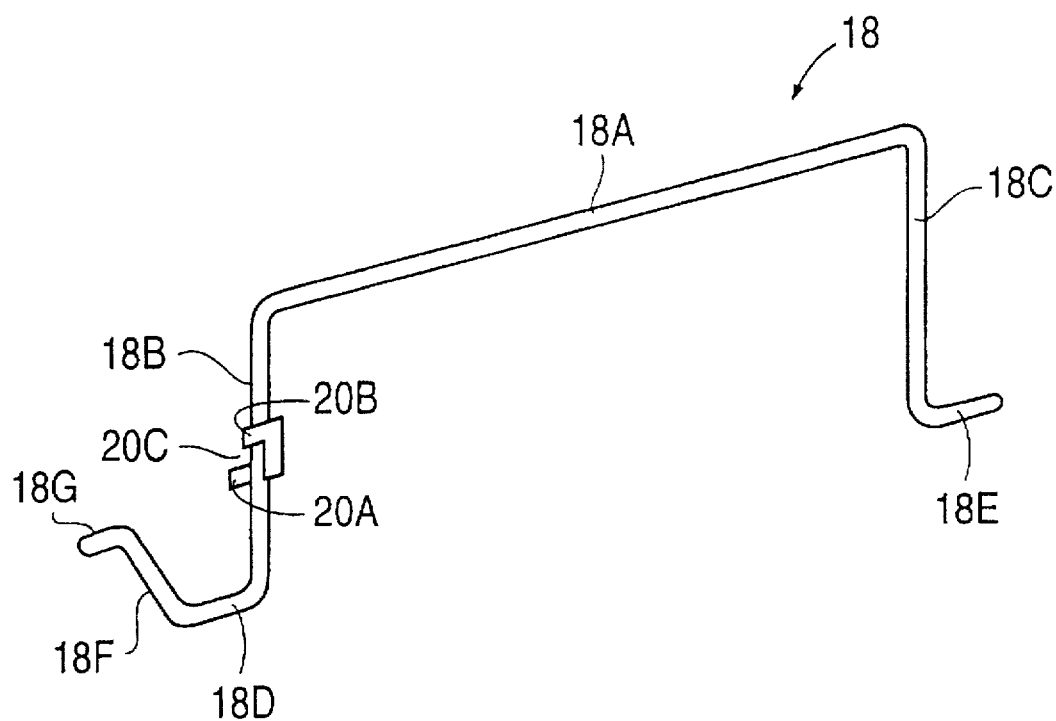
FIG. 3 is a perspective view of a first support member of the support of FIGS. 1 and 2.
Figure 4:
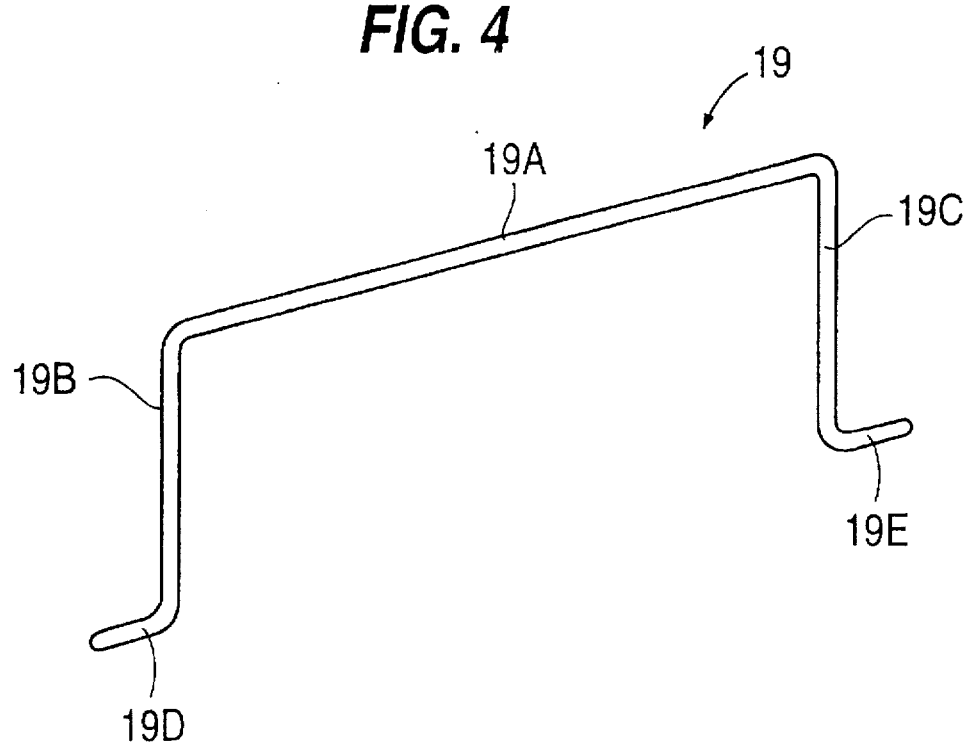
FIG. 4 is a perspective view of a second support member of the support of FIGS. 1 and 2.

The support 17 is formed by a pair of suitably bent metal bars 18 and 19, as separately shown in FIGS. 3 and 4. Each support bar 18 (19) has an inverted broad generally U-shaped configuration, including a straight central limb 18A (19A) and a pair of side limbs 18B and 18C (19B and 19C) extending perpendicularly from corresponding opposite ends of the central limb 18A (19A). The remote end of each side limb 18B/18C (19B/19C) is bent outwards to form a hinge portion 18D/18E (19D/19E) extending parallel to the central limb 18A (19A). The hinge portion 18D of the support bar 18 is further extended to form a leg 18F which projects substantially perpendicular to the plane of the support bar 18. The free end of the leg 18F is bent outwards to form a toe 18G extending parallel to the associated central limb 18A. The central limb 18A is slightly shorter than the other central limb 19A.

At about mid-length, the side limb 18B is fitted with a pair of outwardly protruding lateral lugs 20A (bottom) and 20B (top) which are provided by a one-piece bent metal plate member secured on the side limb 18B. The bottom lug 20A is located on the same side as the leg 18F and the top lug 20B on the opposite side, and the two lugs 20A and 20B are spaced apart along the longitudinal extent of the side limb 18B for a distance about the diameter of the support bars 18 and 19, thereby forming a gap 20C between the lugs 20A and 20B.

Figure 2:
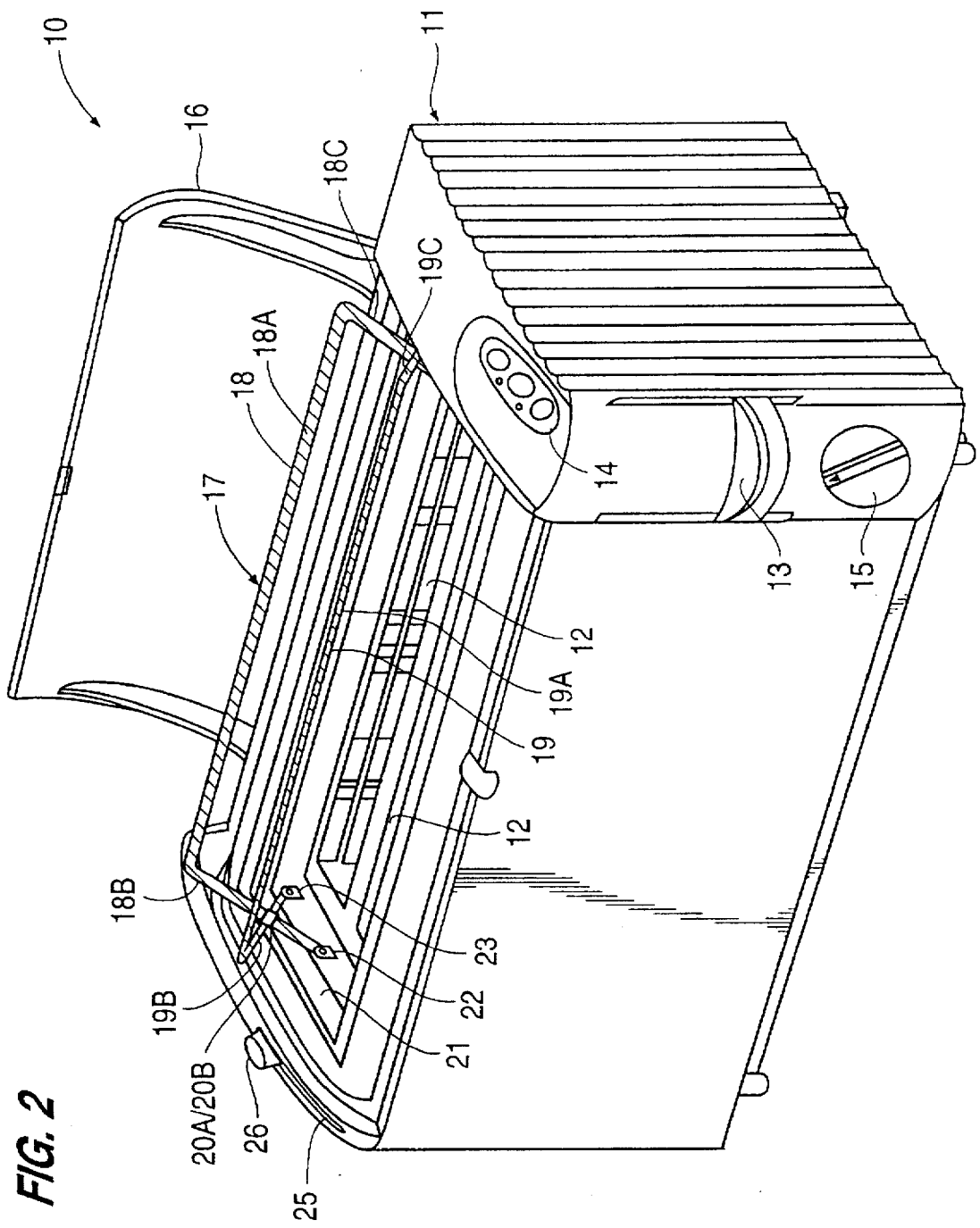
FIG. 2 is a front perspective view corresponding to FIG. 1, showing the support in an extended condition.

As shown in FIGS. 1 and 2, a thin rectangular recess 21 is formed on and around the tops of the compartments 12. Opposite ends of the recess 21 are provided with two pairs of longitudinally aligned upstanding apertured lugs 22 and 23. The first support bar 18 is engaged with its opposite hinge portions 18D and 18E through the pair of aligned holes 22, and the second support bar 19 is engaged with its opposite hinge portions 19D and 19E through the other pair of aligned holes 23. With this arrangement, the support bars 18 and 19 are hinged and thus pivotable relative to the toaster body 11 and have their side limbs 18B/19B or 18C/19C at each end of the central limbs 18A and 19A adjacent each other.

The support 17 is movable between a collapsed condition (FIG. 1) and an extended condition (FIG. 2). In the collapsed condition, the second support bar 19 rests on the first support bar 18, and the two support bars 18 and 19 lie flat within the recess 21, with their adjacent side limbs 18B/18C and 19B/19C half overlapping sideways. The side limb 19B of the second support bar 19 is loosely engaged within the gap 20C of the first support bar 18, with the bottom lug 20A below and the top lug 20B above the side limb 19B (see FIG. 5). In the extended condition, the two support bars 18 and 19 are pivoted for roughly 45° upwards about their respective hinged lugs 22 and 23 towards each other, with their adjacent side limbs 18B/18C and 19B/19C crossing each other in the form of a vertical letter "X" when viewed in the direction of the central limbs 18A and 19A. The side limb 19B of the second support bar 19 remains continuously and at all time engaged (loosely) within the gap 20C of the first support bar 18 (see FIGS. 5 to 7). The central limbs 18A and 19A extend parallel to each other throughout and are now moved to be directly above the corresponding bread compartments 12.

Figure 5:
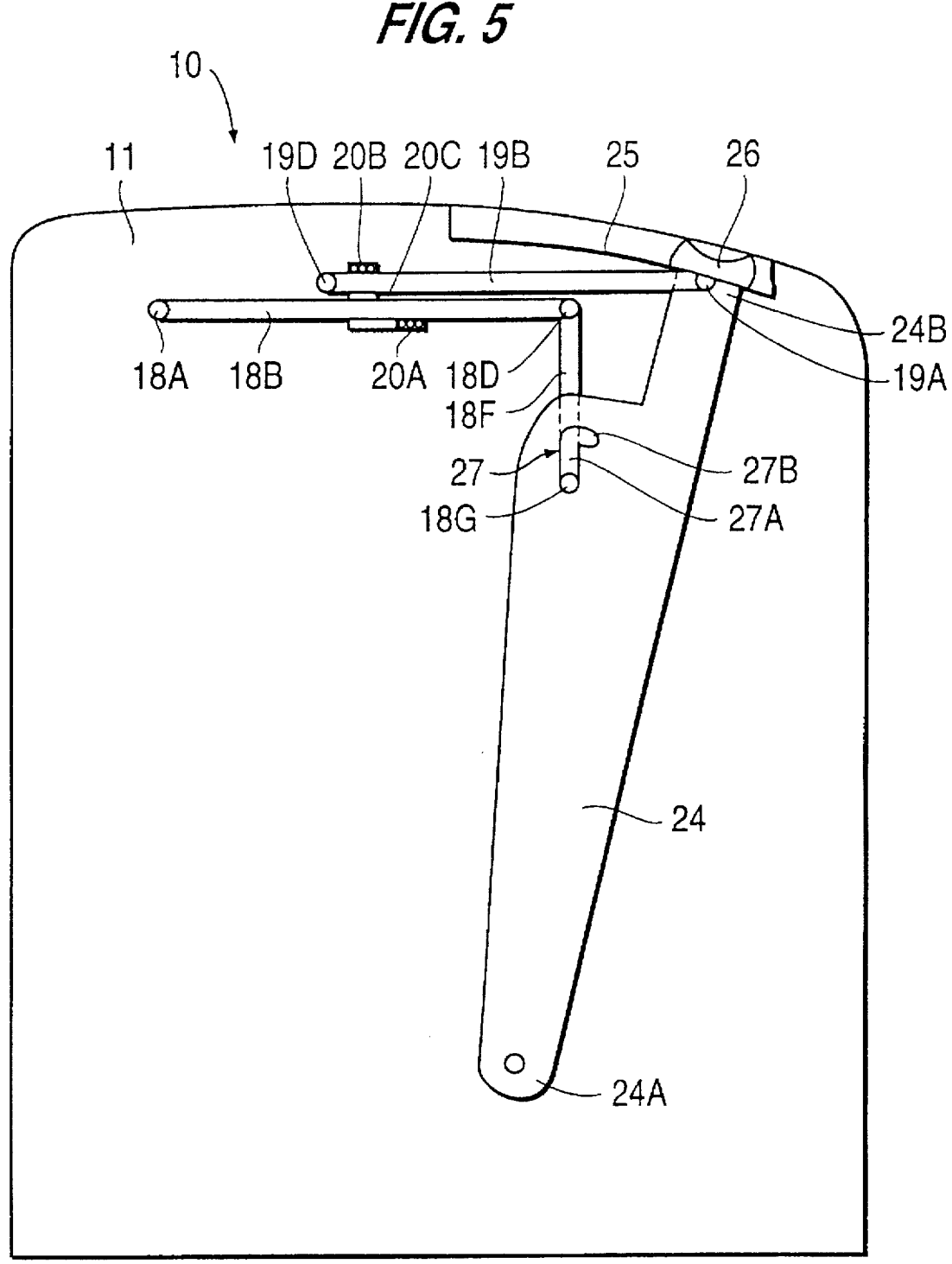
FIG. 5 is an end view of the toaster of FIGS. 1 and 2, showing the support in a collapsed condition, together with an operating mechanism therefor.
Figure 6:
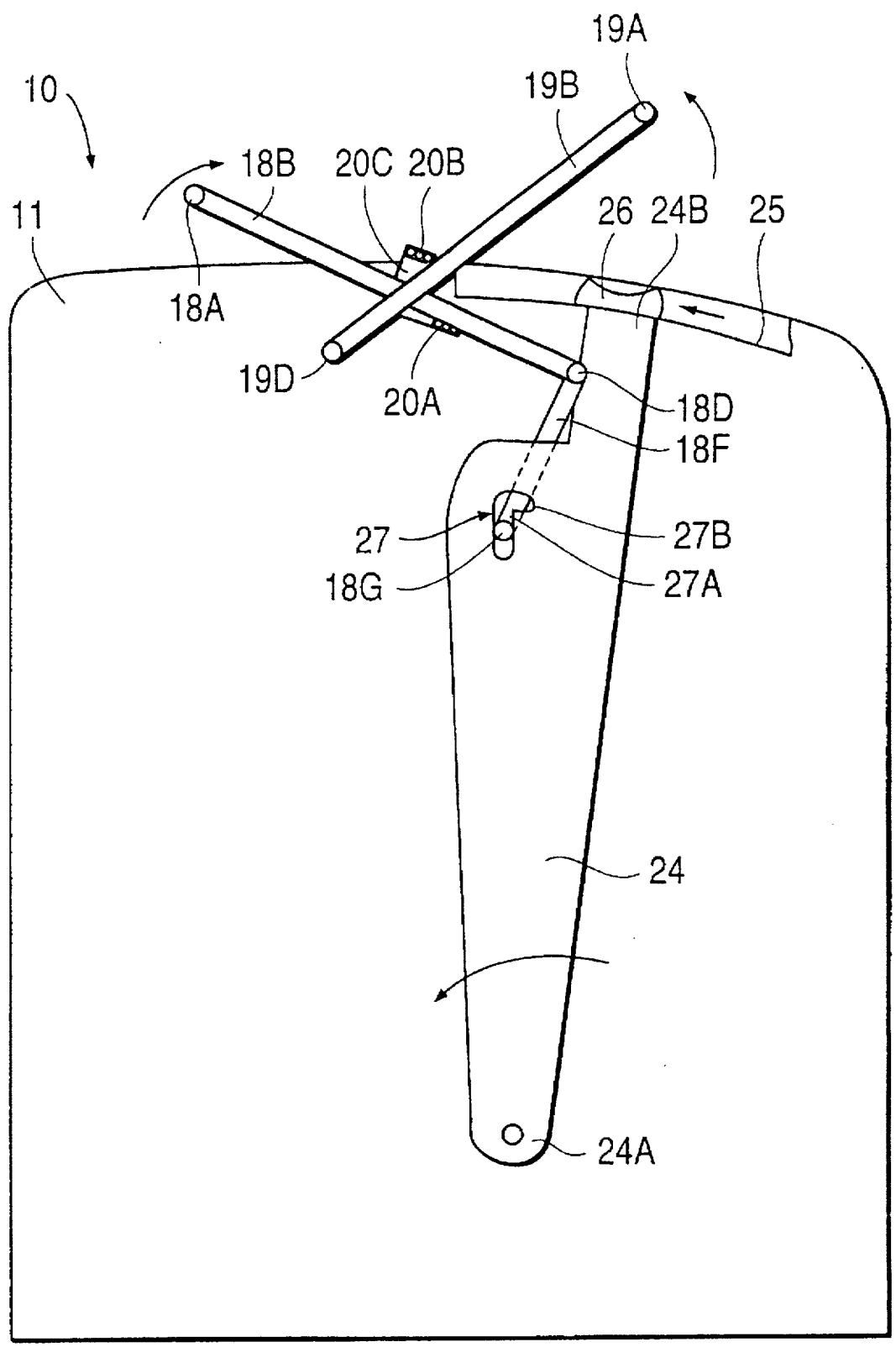
FIG. 6 is an end view corresponding to FIG. 5, showing the support in a semi-extended condition.

The manner in which the support 17 is movable between its collapsed and extended conditions will now be described with reference to FIGS. 5 to 7. A elongate pivotal plate 24 is provided inside the left end of the toaster body 11, which is hinged at its lower end 24A and has its upper end 24B protruding out through a slot 25 formed in the top wall of the toaster body 11. The slot 25 extends in a direction back to front. The exposed upper end 24B of the pivotal plate 24 is fitted with a sliding knob 26 so that the pivotal plate 24 can be pivoted manually. At about quarter length down from the upper end 24B, the pivotal plate 24 has an inverted L-shaped slot 27. The slot 27 has a generally vertical portion 27A and a generally horizontal portion 27B extending forward from the top end of the vertical portion 27A, said portion 27B being relatively shorter. The toe 18G of the first support bar 18 is arranged to always slidably engage within the slot 27 of the pivotal plate 24.

In the collapsed condition of the support 17 (FIG. 5), the toe 18G of the first support bar 18 engages with the bottom end of the slot vertical portion 27A and the sliding knob 26 is in its foremost position. Upon half-way backward sliding of the sliding knob 26 (FIG. 6), the pivotal plate 24 is pivoted half-way backwards and so is the leg 18F of the first support bar 18 through the sliding engagement of its toe 18G with the slot vertical portion 27A. This directly results in upward pivoting of the first support bar 18 about its hinged lugs 22. Through the engagement of its side limb 19B with the bottom lug 20A of the first support bar 18, the second support bar 19 is simultaneously pivoted upwards about its hinged lugs 23. Upon the sliding knob 26 being slid fully backwards (FIG. 7), the toe 18G of the first support bar 18 finally reaches and thus engages within the horizontal portion 27B of the slot 27. When this happens, the first support bar 18 and hence also the second support bar 19 are fully extended, with their adjacent side limbs 18B/18C and 19B/19C crossing each other at about right angles, which is the aforesaid extended condition of the support 17.

In the extended position of the support 17, the remote end of the horizontal portion 27B of the slot 27 in the pivotal plate 24 is bent slightly downwards such that the toe 18G of the first support bar 18 is locked in engagement with the remote end, through its resilience and/or the slight drop into the remote end, thereby maintaining the extended position of the support 17. The side limb 19B of the second support bar 19 comes into abutment with the top lug 20B on the first support bar 18, whereby the second support bar 19 is prevented from over-pivoting or pivoting upwards from the first support bar 18 and as a result the extended condition of the support 17 is maintained.

It is appreciated that the two lugs 20A and 20B on the first support bar 18 act as a sliding hinge insofar as the side limb 19B of the second support bar 19 is concerned. This sliding hinge serves to transmit the pivoting drive imposed upon the first support bar 18 by the pivotal plate 24 to the second support bar 19, and slides to stay adjacent to the crossing point between the side limbs 18B and 19B when the support 17 is fully extended.

The side limbs 18B, 18C, 19B and 19C of the support bars 18 and 19 have substantially the same length such that the pair of central limbs 18A and 19A provides, in the extended condition, a horizontal rack for supporting a bun, a roll or the like above the compartments 12 for warming by the heating elements inside the compartments 12. The stability of the rack/support 17 is enhanced by the sliding hinge formed by the lugs 20A and 20B being provided above the toaster body 11, which also facilitates the initial movement of the support 17 from its collapsed condition. The support 17 is collapsible when not in use by manually sliding back the operating knob 26 forwards. To further stabilize the support 17, the sliding knob 26 is arranged to be in a semi-tight or suitably tight sliding engagement with opposite sides of the slot 25 in the toaster body 11.

The invention has been given by way of example only, and various modifications of and/or alterations to the described embodiment may be made by persons skilled in the art without departing from the scope of the invention as specified in the appended claims.

What is claimed is:

1. An electric toaster comprising:
    a body having at least one compartment for accommodating a slice of bread,
    an electrical heating element mounted on opposite sides of the at least one compartment for heating the at least one compartment,
    a hinged support provided on the body and above the at least one compartment for supporting a piece of food for warming by the heating element, said support being movable between an extended condition for operation and a collapsed condition for storage and being formed by two inverted broad generally U-shaped elongate support members, each of said support members having a central limb for supporting a piece of food and a pair of oppositely disposed first and second side limbs, said support members being arranged to have said first side limbs extending from one end of the central limbs adjacent to each other, said pair of first side limbs being defined as a primary first side limb and a secondary side limb, each of said pair of first side limbs having a portion which is substantially co-planar with the central limb extended therefrom, and said second side limbs extending from another end of the central limbs adjacent to each other, and a manual operating member for moving the support between the extended and collapsed conditions, wherein one of said primary and secondary first side limbs is in engagement with the operating member for movement thereby, and the portion of one of said primary and secondary first side limbs has, at a position above the body, at least one lateral part in engagement with the portion of the other of said primary and secondary first side limbs such that the two support members are simultaneously movable by the operating member.

2. The electric toaster as claimed in claim 1, wherein the at least one lateral part is in substantially continuous engagement with the other of said primary and secondary first side limbs.

3. The electric toaster as claimed in claim 1, wherein said primary first side limb is in engagement with the operating member and has the at least one lateral part.

4. The electric toaster as claimed in claim 1, wherein each pair of said first side limbs and of said second side limbs cross each other substantially in the form of a letter "X" when the support is in the extended condition, and the at least one lateral part is provided on said one of said first side limbs at a position adjacent to the crossing point between said first side limbs.

5. The electric toaster as claimed in claim 1, wherein said one of said primary and secondary first side limbs has two lateral parts for engagement with the other of said primary and secondary first side limbs in order to maintain the support in the extended condition.

6. The electric toaster as claimed in claim 5, wherein the two lateral parts form a gap therebetween for engagement with the other of said primary and secondary first side limbs.

7. The electric toaster as claimed in claim 6, wherein the two lateral parts are provided by a one-piece member secured to said one of said primary and secondary first side limbs.

8. The electric toaster as claimed in claim 1, wherein a sliding hinge is provided by the at least one lateral part between the pair of said first side limbs.

9. The electric toaster as claimed in claim 1, wherein the operating member is a pivotal member hinged at one end with respect to the body and having at another end a sliding knob for manual operation thereof.

10. The electric toaster as claimed in claim 2, wherein said primary first side limb is in engagement with the operating member and has the at least one lateral part.

11. The electric toaster as claimed in claim 2, wherein each pair of said first side limbs and of said second side limbs cross each other substantially in the form of a letter "X" when the support is in the extended condition, and the at least one lateral part is provided on said one of said first side limbs at a position adjacent to the crossing point between said first side limbs.

12. The electric toaster as claimed in claim 3, wherein each pair of said first side limbs and of said second side limbs cross each other substantially in the form of a letter "X" when the support is in the extended condition, and the at least one lateral part is provided on said one of said first side limbs at a position adjacent to the crossing point between said first side limbs.

13. The electric toaster as claimed in claim 2, wherein said one of said primary and secondary first side limbs has two lateral parts for engagement with the other of said primary and secondary first side limbs in order to maintain the support in the extended condition.

14. The electric toaster as claimed in claim 3, wherein said one of said primary and secondary first side limbs has two lateral parts for engagement with the other of said primary and secondary first side limbs in order to maintain the support in the extended condition.

15. The electric toaster as claimed in claim 4, wherein said one of said primary and secondary first side limbs has two lateral parts for engagement with the other of said primary and secondary first side limbs in order to maintain the support in the extended condition.

16. The electric toaster as claimed in claim 13, wherein the two lateral parts form a gap therebetween for engagement with the other of said primary and secondary first side limbs.

17. The electric toaster as claimed in claim 14, wherein the two lateral parts form a gap therebetween for engagement with the other of said primary and secondary first side limbs.

18. The electric toaster as claimed in claim 15, wherein the two lateral parts form a gap therebetween for engagement with the other of said primary and secondary first side limbs.

19. The electric toasters as claimed in claim 2, wherein a sliding hinge is provided by the at least one lateral part between the pair of said first side limbs.

20. The electric toaster as claimed in claim 2, wherein the operating member is a pivotal member hinged at one end with respect to the body and having at another end a sliding knob for manual operation thereof.

* * * * *